A. T. WEISS.
LOCKING MECHANISM FOR DRAWERS FOR FILING CABINETS.
APPLICATION FILED SEPT. 21, 1905.

1,031,751.

Patented July 9, 1912.

4 SHEETS—SHEET 1.

Witnesses
Walter B. Payne
Clarence A. Bateman

Inventor
Albert T. Weiss
By
Frederick F. Church
his Attorney

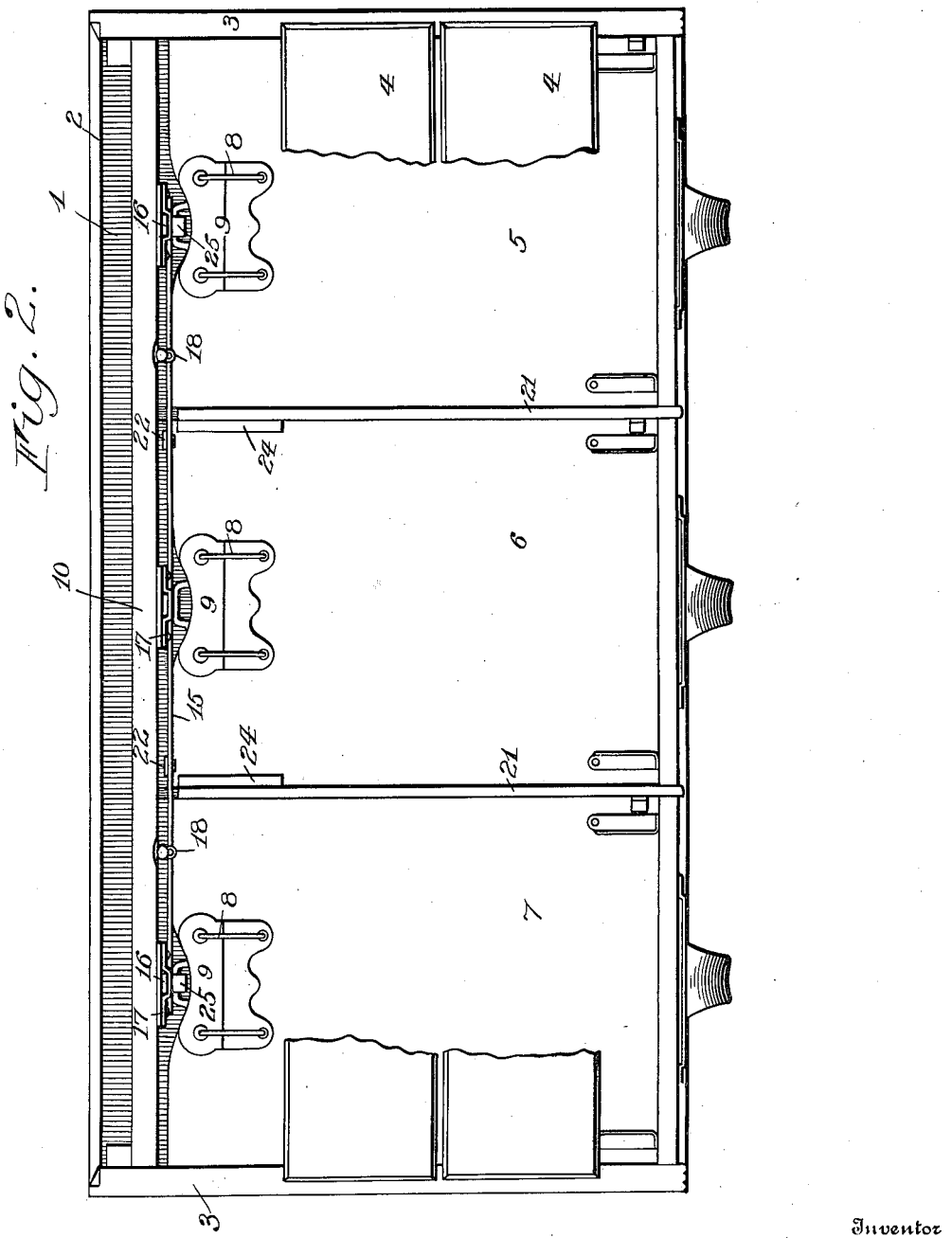

A. T. WEISS.
LOCKING MECHANISM FOR DRAWERS FOR FILING CABINETS.
APPLICATION FILED SEPT. 21, 1905.
1,031,751.
Patented July 9, 1912.
4 SHEETS—SHEET 3.
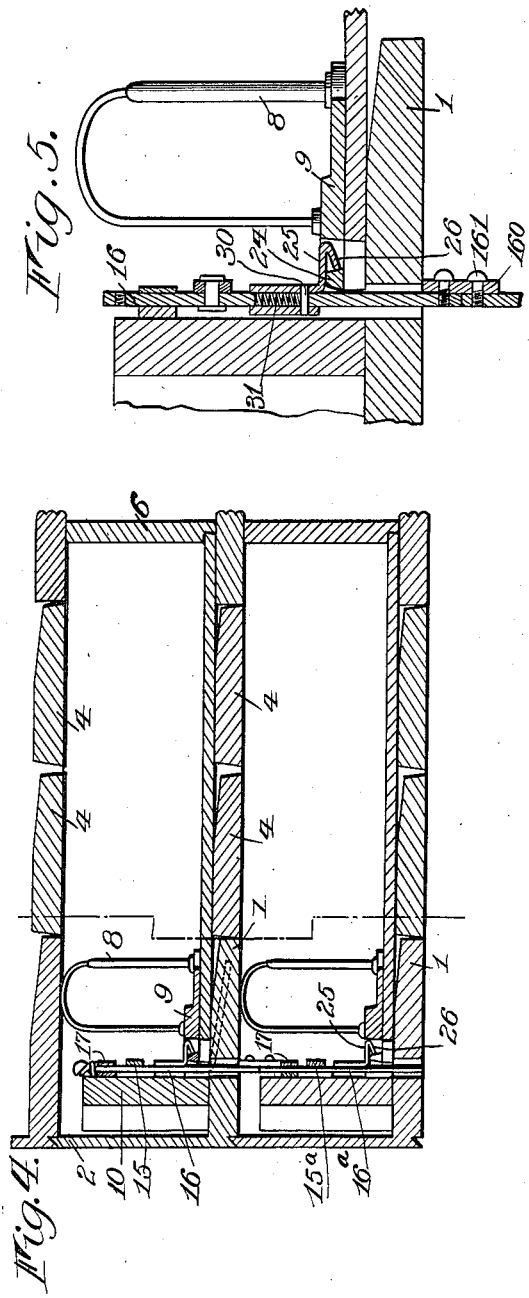
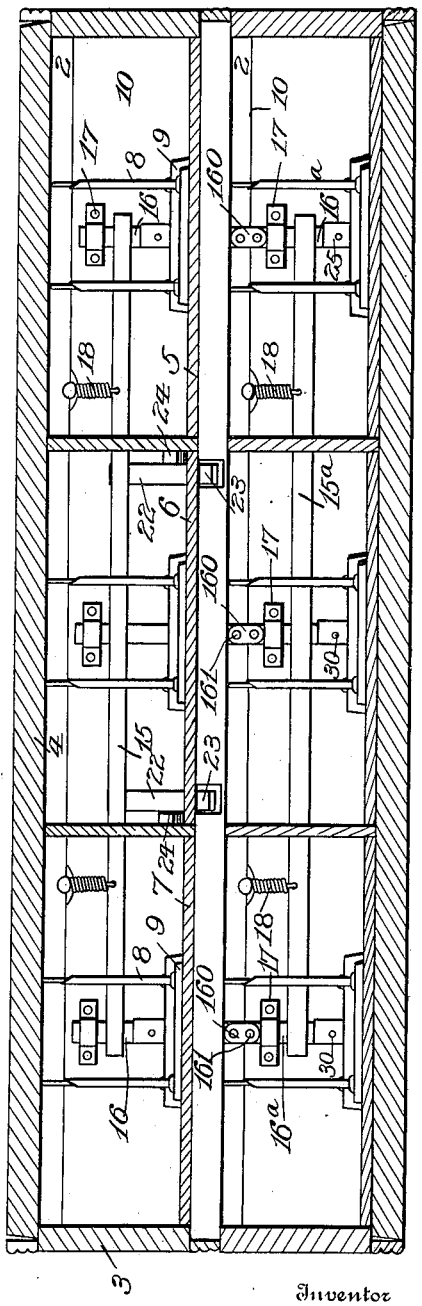
Witnesses
Walter B. Payne.
Clarence A. Bateman.
Inventor
Albert T. Weiss
By Frederick S. Church
his Attorney A. T. WEISS.
LOCKING MECHANISM FOR DRAWERS FOR FILING CABINETS.
APPLICATION FILED SEPT. 21, 1905.

1,031,751.

Patented July 9, 1912.

4 SHEETS—SHEET 4.

Witnesses
Walter B. Payne
Clarence A. Bateman

Inventor
Albert T. Weiss
By Frederick H. Church
his Attorney

UNITED STATES PATENT OFFICE.

ALBERT T. WEISS, OF ROCHESTER, NEW YORK, ASSIGNOR TO THE YAWMAN & ERBE MANUFACTURING COMPANY, OF ROCHESTER, NEW YORK, A CORPORATION OF NEW YORK.

LOCKING MECHANISM FOR DRAWERS FOR FILING-CABINETS.

1,031,751.            Specification of Letters Patent.      Patented July 9, 1912.

Application filed September 21, 1905. Serial No. 279,460.

*To all whom it may concern:*

Be it known that I, ALBERT T. WEISS, of Rochester, in the county of Monroe and State of New York, have invented certain new and useful Improvements in Locking Mechanism for Drawers for Filing-Cabinets; and I do hereby declare the following to be a full, clear, and exact description of the same, reference being had to the accompanying drawings, forming a part of the specification, and to the reference-numerals marked thereon.

My present invention has for its object to provide an improved form of locking mechanism for securing the removable drawers or slides of filing cases or cabinets comprising generally, means for locking a plurality of drawers which is controlled so as to lock or unlock all of them by the movement of a single drawer.

My invention has for its further object to provide a locking mechanism having an independently movable part coöperating with each slide or drawer and arranged to permit one omitted from the case to be inserted and automatically engaged without releasing said mechanism.

To these and other ends the invention consists in certain improvements and combinations of parts all as will be hereinafter more fully described, the novel features being pointed out in the claims at the end of the specification.

Figure 1:
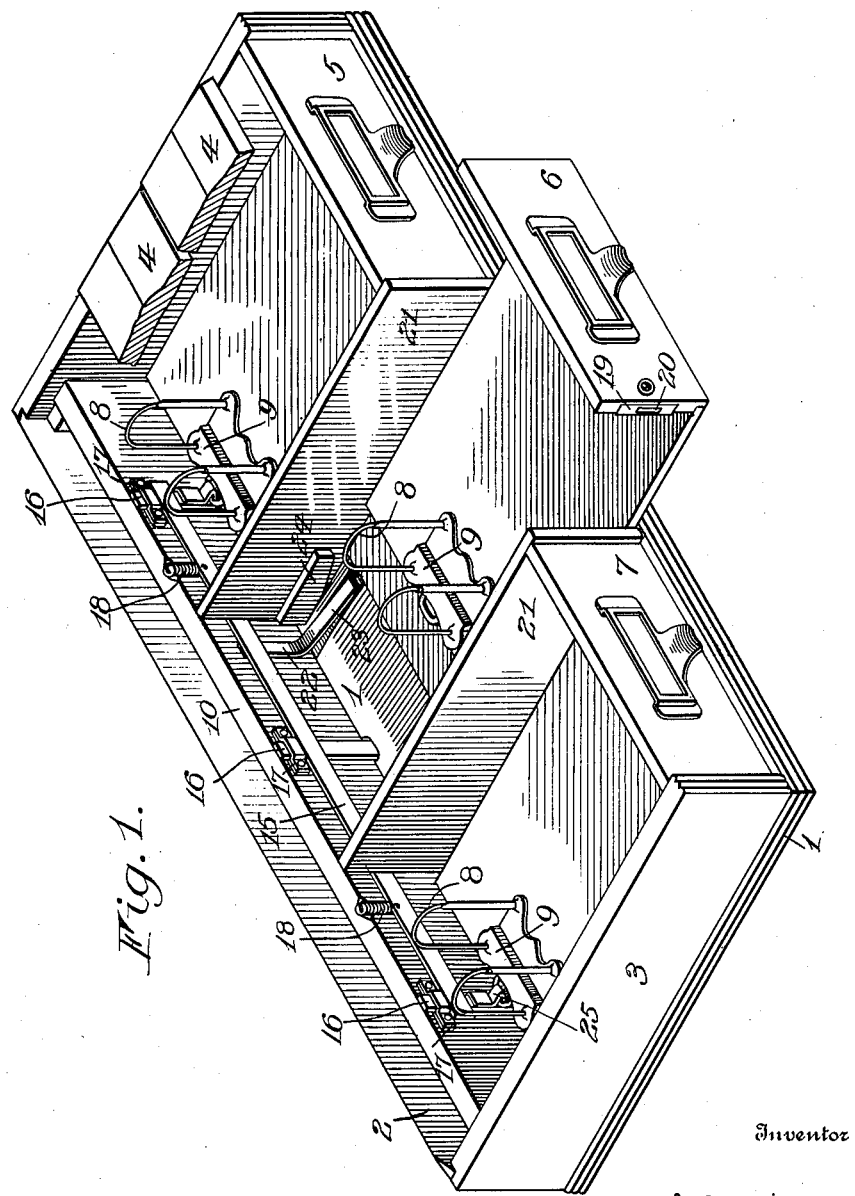
Figure 6:
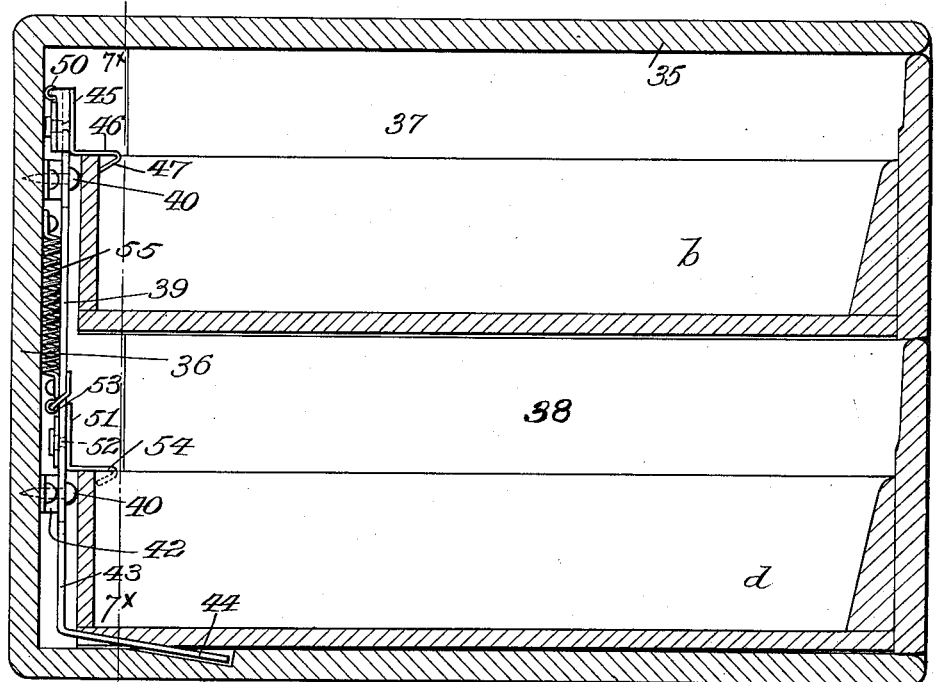
Figure 7:
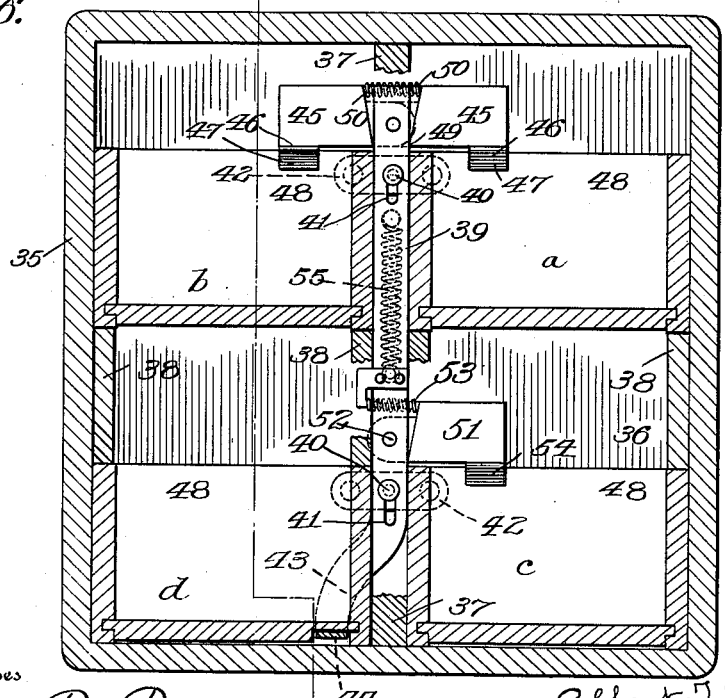

In the drawings: Figure 1 is a perspective view of a unit of a sectional cabinet showing the mechanism embodying my invention applied thereto. Fig. 2 is a plan view thereof. Fig. 3 is a longitudinal sectional view showing two sections or units, one mounted upon the other, and the mechanism in each connected for simultaneous operation. Fig. 4 is a cross sectional view thereof. Fig. 5 is an enlarged detail view. Fig. 6 is a view, similar to Fig. 4, showing a modified form of the invention, and Fig. 7 is a sectional view thereof on the line $7^x$ $7^x$ of Fig. 6.

Similar reference numerals in the several figures indicate similar parts.

In illustrating my invention I have shown it applied to a unit or component part of a sectional filing cabinet having a plurality of drawers and comprising a base 1, a back 2 and the ends 3, connected by the cleats 4 which are adapted to fit into a recess pro-
vided upon the bottom of an adjacent section, when one or more of such sections are stacked together, as shown in Fig. 3. In the present instance the unit is shown as provided with three filing drawers or slides indicated by 5, 6 and 7 each of which is provided with a retaining device for letters or papers having arch wires 8 mounted upon a base 9 secured to the bottom of the drawer. At the rear of the unit or section is a wall 10 on the face of which is the locking mechanism comprising the longitudinally extending member or bar 15 having at its ends and central portion vertically disposed guiding members 16, held loosely in position by straps 17 attached to the wall 10.
The straps are located above the bar 15 and serve to limit its upward movement when it is retracted into inoperative position by the springs 18 to release the drawers.

In Fig. 1 the complete mechanism is shown in a single unit or section, that is, there are locking devices for two of the drawers and devices which are controlled by the insertion or partial removal of the third drawer, which for convenience may be termed the controller, such as the central one 6 which may be secured against removal by a key lock 19 having a bolt 20 adapted to engage the proximate side of one of the partitions 21. Extending downwardly from the bar 15 is an arm or arms, having a forwardly projecting end 23 which is inclined relatively to the bottom of the drawer 6, so that when engaged thereby it will be forced downwardly to operate the bar 15 and carry the locking members thereon into engagement with the drawers 5 and 7. To prevent the drawer from rising in the cabinet, when engaging the inclined end of the arm 22, I provide guides 24 on the partition 21 which extend above the drawer and form stops which hold its rear end in position in the cabinet.

Various forms of connections may be employed between the member or bar 15 and the drawers which may be varied to meet the requirements arising in filing cases differing in construction from the one illustrated, but they all embody engaging members 25 having an end 26 adapted to interlock with the drawer or an abutment thereon such as a loop 24 provided on the arch base 9. In order to permit a drawer to be inserted if, for instance, the locking mechanism has been set in operative position the engaging member is preferably mounted to move independently on the guiding members 16 and as a convenient means of mounting said members they are formed, as shown in Fig. 5, with the front and rear walls embracing the corresponding sides and one edge of said bars to which they are secured by pins 30 passing through elongated apertures therein. Arranged in said apertures and bearing against the upper sides of the pins are springs 31 operating to normally hold the engaging members in operative position, as shown in Figs. 4 and 5, but permitting them to be elevated when the coöperating abutment or the drawer is forced into engagement with their bevel ends 26.

Where two or more units or sections are arranged in a vertical tier a single controlling drawer or other operating means will answer for all of them and it may be located in either an upper, a lower or an intermediate unit or section, as will be readily understood. In Figs. 3 and 4 I have shown two of such sections or units, the one containing the controlling drawer being superposed upon the other which is provided with a longitudinal bar 15ᵃ and the vertical guide bars 16ᵃ arranged in alinement with the bars 16, of the upper section, and connected thereto by plates 160 and screws 161, an arrangement enabling an indefinite number of sections to be combined into a single case in which the drawers are all controlled by a single member secured against unauthorized removal by a key lock.

In Figs. 6 and 7 I have illustrated my invention as applied to a cabinet having drawers adapted to contain card indexes which comprise a casing 35 provided with a back 36 in which the four, or more, drawers a, b, c and d are inclosed. The casing is divided centrally by a vertically extending partition 37 and the upper set of drawers a and b are supported upon ways 38 secured thereto and to the sides of the casing. The set of ways supporting one of the drawers also extends downwardly in proximity of the upper edges of the lower drawer d forming stops, similar to the stops 24, for preventing upward movement of the latter. The partition 37 is cut away at its rear end and in alinement therewith is arranged the locking mechanism which is supported at the back 36. This mechanism comprises a vertically movable bar 39 supported at points near its upper and lower ends by headed studs 40 extending through elongated apertures 41, in the bar, and mounted on brackets 42 secured to the rear wall 36 of the cabinet. At its lower end the bar extends laterally, as shown at 43, in rear of the drawer d where its extremity projects forwardly and downwardly at an angle to the bottom of the drawer, as indicated by 44. Pivoted at the upper end of the bar and extending at opposite sides thereof are locking members in the form of wings 45 having forwardly extending fingers 46, provided with bevel ends 47 forming latches which are adapted to extend over the rear walls 48 of the drawers a and b respectively. The wings are normally held in horizontal position by the shoulders 49 thereon, which abut the sides of the bar 39 beneath their pivoted point, and a spring 50 located between them above the said pivot. A similar wing 51 is also pivoted to the bar at the point 52 which is yieldingly held in operative position by a spring 53 whereby its latch projection 54 will coöperate with the end of the drawer c.

The drawer d which forms a controlling member in a cabinet of this character is secured against removal by a suitable key lock, not shown, but similar to the lock 19 in the drawer 6, and it will be seen that when the drawer d is secured in position the bar 39 is forced downwardly so that the projections on the wings or locking members 45 and 51 will engage the rear ends of their respective drawers, which in this instance form the interlocking abutments, corresponding to the loops 25 on the drawers 5, 6 and 7, for preventing their removal. By partially withdrawing the drawer d, out of engagement with the bevel end 44, the bar 39 is permitted to be drawn upwardly, by the tension of the spring 55 to carry the locking members out of operative position and simultaneously release all of the drawers. If the drawer d is closed and locked, inadvertently, while one of the drawers a, b and c is withdrawn from the cabinet, or is not inserted in its proper position, it may be moved inwardly into engagement with the latch end 47 of its respective locking member or wing which will rotate sufficiently to permit the abutment or rear end of the drawer to pass beneath said projection.

While I have only shown the locking devices, embodying my invention as applied to a card index cabinet having four drawers, which are arranged in a single case, it will be readily understood that if a greater number of drawers are provided additional parts duplicating those described will be employed and if the cabinet is made in units or sections the corresponding parts of the bars 39 will be detachably connected, as will be understood.

The locking devices embodying my invention are simple in construction and may be readily applied to filing cabinets heretofore in use. The arrangement of the parts as illustrated enables a series of drawers in a cabinet to be locked to prevent access to their contents by simply locking a single drawer or controlling member which secures all of the other slides or drawers. By yieldingly supporting the latches or engaging members 25 and 45 in operative position by means of the springs 31 and 50 the slides or drawers, when closed, will be positively locked making it impossible to release them by inverting the cabinet.

I claim as my invention:

1. The combination with a filing cabinet having drawer openings disposed horizontally therein and provided with a backing, an interior wall located in front of and in proximity to the rear wall and drawers fitting the cabinet one of which is of skeleton form comprising a bottom and devoid of side pieces, of locking mechanism supported on said interior wall comprising devices adapted to engage the several drawers and a connecting operating bar extending horizontally, an arm connected to said mechanism provided with an inclined end projecting forwardly beneath the skeleton drawer and coöperating with the side of the bottom thereof to actuate the mechanism into operative position and a stop engaging the other side of said drawer bottom for holding the latter in position in the cabinet.

2. The combination with a filing cabinet having a plurality of drawers and a locking mechanism therefor comprising an operating member having guides arranged thereon in rear of the drawers and provided with apertures, of engaging members movably mounted on the guides having outwardly projecting latch ends coöperating with their respective drawers, securing pins on the members entering the apertures in the guides and springs also arranged therein and bearing on the pins.

3. The combination with a cabinet comprising a plurality of superposed sections detachably connected together, and each having a row of drawers disposed horizontally therein, of a vertically movable member in rear of the drawers of each section and having latches movable thereon to coöperate with their respective drawers, a horizontally extending bar in each section connecting the several members therein for simultaneous vertical movement, devices detachably connecting the vertically movable members of an upper section with corresponding members in the section next below it, and means for operating the connected members and bars to cause the latches to be positioned to either lock or release the drawers.

4. The combination with a cabinet comprising a plurality of superposed sections detachably connected together and each provided with a backing and having a horizontal series of drawers operating therein, and an interior partition wall located between the drawers and backing of each section, of members supported on the partition wall and guided thereon to move transversely to the plane of movement of the drawers, one of said members being located in rear of each drawer, a latch movable on each of said members and yieldingly coöperating with the respective drawer, a horizontal bar connecting all of the movable members of each section, devices detachably connecting each movable member of one section with the corresponding member in a section next below it, and means for operating the horizontal bars and the members to cause the latches to lock and release the drawers in the several sections of the cabinet simultaneously.

ALBERT T. WEISS.

Witnesses:
G. WILLARD RICH,
M. I. ST. HELENS.